US012608337B1

(12) United States Patent
Alurkar et al.

(10) Patent No.: US 12,608,337 B1
(45) Date of Patent: Apr. 21, 2026

(54) ARCHIVAL STATUS RETENTION FLAG FOR STORED FILES

(71) Applicant: Zoom Video Communications, Inc., San Jose, CA (US)

(72) Inventors: Aakash Atul Alurkar, San Jose, CA (US); Adi David Regev, Fairlawn, NJ (US)

(73) Assignee: Zoom Communications, Inc., San Jose, CA (US)

( * ) Notice: Subject to any disclaimer, the term of this patent is extended or adjusted under 35 U.S.C. 154(b) by 5 days.

(21) Appl. No.: 18/660,890

(22) Filed: May 10, 2024

(51) Int. Cl.
| | |
|---|---|
| *G06F 16/11* | (2019.01) |
| *G06F 16/14* | (2019.01) |
| *G06F 16/182* | (2019.01) |
| *G06F 16/23* | (2019.01) |

(52) U.S. Cl.
CPC .......... *G06F 16/113* (2019.01); *G06F 16/125* (2019.01); *G06F 16/148* (2019.01); *G06F 16/156* (2019.01); *G06F 16/1824* (2019.01); *G06F 16/2372* (2019.01)

(58) Field of Classification Search
CPC .... G06F 16/113; G06F 16/148; G06F 16/156; G06F 16/1824; G06F 16/2372
USPC .......................................................... 707/662
See application file for complete search history.

(56) References Cited

U.S. PATENT DOCUMENTS

| | | | | |
|---|---|---|---|---|
| 11,080,233 B2 * | 8/2021 | Landman | .............. | G06F 16/113 |
| 2005/0055519 A1 * | 3/2005 | Stuart | .................. | G06F 16/122 |
| | | | | 711/159 |
| 2006/0010301 A1 * | 1/2006 | Yagawa | ............... | G06F 16/125 |
| | | | | 711/163 |
| 2007/0179990 A1 * | 8/2007 | Zimran | ................ | G06F 16/185 |
| | | | | 707/999.201 |

FOREIGN PATENT DOCUMENTS

| | | | | |
|---|---|---|---|---|
| WO | WO-2021014324 A1 * | 1/2021 | ........... | G06F 16/113 |

\* cited by examiner

*Primary Examiner* — Shahid A Alam
(74) *Attorney, Agent, or Firm* — Kilpatrick Townsend & Stockton LLP

(57) ABSTRACT

Example methods and systems provide a system that stores, in a storage device, a file and a descriptor corresponding to the file. The descriptor includes a retention time for the file. The system also sets an archival status retention flag to prevent the deletion of the file from the storage device, notwithstanding the retention time set by the descriptor. The system can transmit a copy of the file to an archive, and when a copy of the file has been safely stored in the archive, the collaboration platform receives an input from the archive confirming the archival status of the file. The input is configured to clear the archival status retention flag. Once the flag has been cleared, the file will be deleted from the collaboration platform in accordance with the retention policy for the file.

14 Claims, 7 Drawing Sheets

SYSTEM
200

CLIENT DEVICE
230

CLIENT DEVICE
250

NETWORK SERVICES
214

REAL-TIME MEDIA
212

TELEPHONY GATEWAY
218

VIDEO ROOM GATEWAY
216

VIDEO CONFERENCE PROVIDER
210

USER IDENTITY PROVIDER
215

CLIENT DEVICE
220

CLIENT DEVICE
240

400

STORE FILE AND CORRESPONDING DESCRIPTOR
INCLUDING A RETENTION TIME FOR THE FILE
410

SET ARCHIVAL STATUS RETENTION FLAG TO
PREVENT THE DELETION OF THE FILE FROM
STORAGE
412

TRANSMIT A COPY OF THE FILE TO THE ARCHIVE
414

CLEAR THE FLAG IN RESPONSE TO INPUT FROM THE
ARCHIVE INDICATING FILE HAS BEEN COPIED
416

SELECTIVELY DELETE THE FILE FROM THE STORAGE
DEVICE IN ACCORDANCE WITH THE RETENTION TIME
ONCE THE FLAG HAS BEEN CLEARED
418

*FIG. 4*

ARCHIVAL STATUS RETENTION FLAG FOR STORED FILES

FIELD

The present application generally relates to a collaboration platform such as for videoconferencing, digital phone, chat, etc., where records of the various communication sessions taking place are stored in files and a file is retained subject to an archival status retention flag in addition to a records retention policy. More particularly the archival status retention flag is configured to prevent the deletion of a retained file from the storage device until the file has been safely archived to prevent to prevent deletion according to the records retention policy if archiving the file is delayed or fails due to an error or process disruption.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

FIG. 4 illustrates an example method for providing an archival status retention flag for stored files.

DETAILED DESCRIPTION

Figure 1:
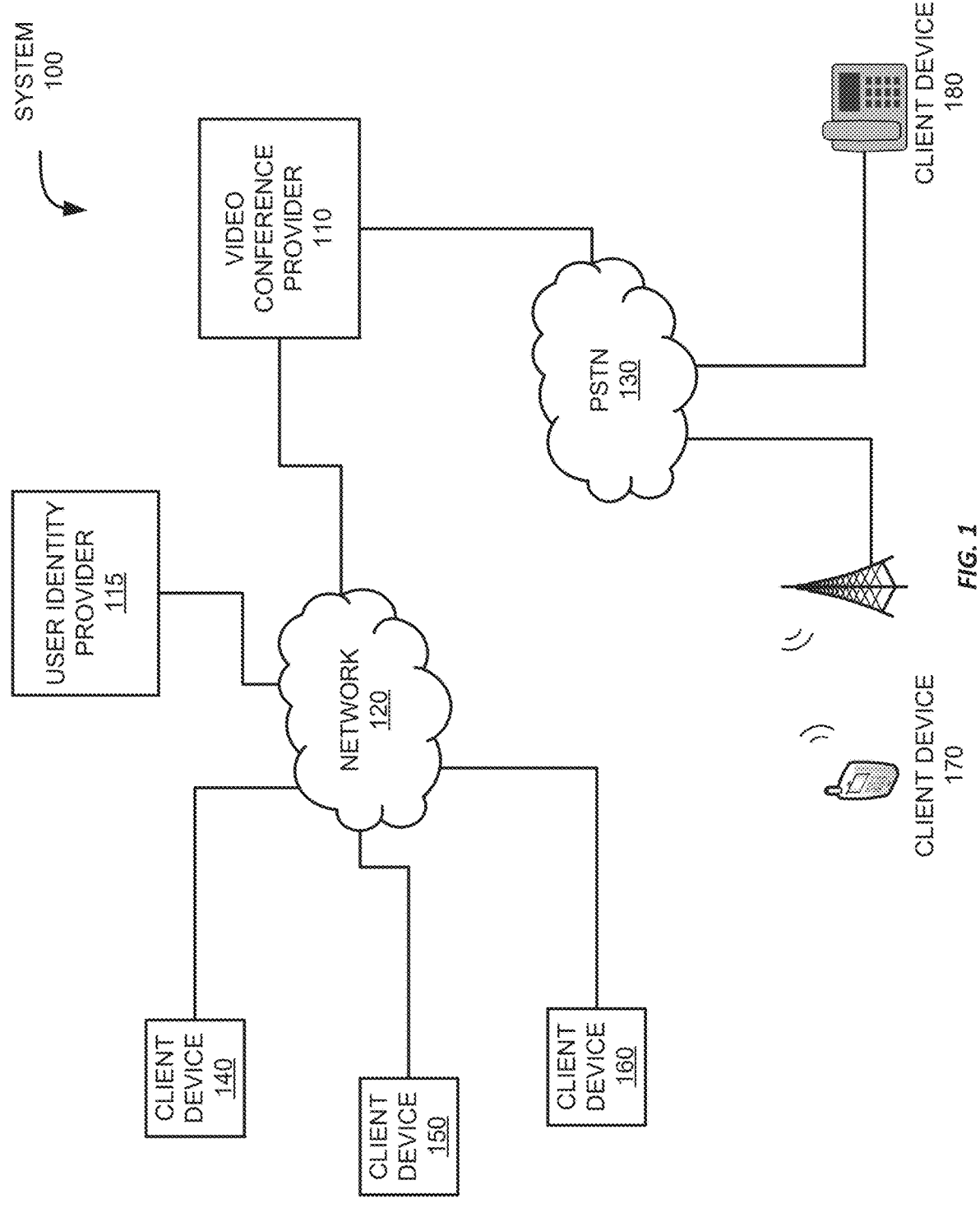
FIGS. 1 through 3 illustrate example systems to enable an archival status retention flag for stored files.

Examples are described herein in the context of systems and methods for providing an archival status retention flag for stored files. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Digital telephone systems as well as videoconferencing systems enable their users to engage in teleconferencing by creating and attending conferences (or "meetings") via various types of client devices. After joining a meeting, the participants receive audio and/or video streams or feeds (or "multimedia" streams or feeds) from the other participants and, in the case of a videoconference, are presented with views of the video feeds from one or more of the other participants and audio from the audio feeds. Using these different modalities, the participants can see and/or hear each other, engage more deeply, and generally have a richer experience despite not being physically in the same space.

In the case of videoconferencing systems, to create a meeting, a person (referred to as the "host" or "meeting host") accesses the videoconferencing system, schedules a new meeting, and identifies one or more other people to invite to the meeting. In response to the host creating the meeting, the videoconference system establishes the meeting by creating a meeting identifier and, if desired, a passcode or other access control information. The host can then send the meeting identifier (and access control information) to each of the invitees, such as by email. Once the meeting is started, the invitees can then access and join the meeting using the meeting identifier and any provided access control information. The initial, or main host can, in some systems, make another participant a co-host. For purposes of the discussion herein, the term "host" encompasses hosts and co-hosts. Hosts can manage and control the videoconferencing session.

A chat application can be used to streamline communication and promote collaboration and transparency between users. A chat application provides instant text messaging between users who have the application installed on a client device or via a web-based application. Some chat applications are integrated with a videoconferencing application or a project management application. A chat application can provide users in an enterprise with a readily available and comfortable way to reach out to one another, make connections, and increase communication efficiency. Chat systems typically include a server application or component along with client applications for different types of user devices. Chat content is persistently stored in the server application or component so that the chat history is available to participants in the future even after all participants have disconnected or shut down their client applications for a time. Chat applications can include functions for creating chat groups. These functions may include various security mechanisms for limiting access to groups based on divisions within the enterprise, credentials established for a group, etc.

Numerous vendors provide data archiving services for enterprises of various sizes, or alternatively, provide data archiving products that an enterprise can license to implement its own archiving solution. Files to be archived can include text documents, images, and recordings of audio and video. A collaboration platform may provide recording capabilities, wherein the recording files are stored initially in a storage device associated with the collaboration platform, such as in a cloud-based system or on client devices used by participants in a teleconference. Documents that include word processing text, chat messages, or digital whiteboard notes can be similarly stored in files. A file can then be forwarded to an archive for long term storage, but is typically retained where originally stored in accordance with document retention policies. These document retention policies can be implemented by using a stored descriptor that corresponds to the file. This descriptor can include, among other information, a retention time, after which the file will be automatically deleted.

In some circumstances, a file can be deleted in accordance with document retention policies without being archived, even if archival storage is needed and intended. As examples, connectivity failures, network outages, or power outages can delay or prevent files from being copied from regularly accessible storage devices to an archive used for long term storage. Configuration errors made by support personnel can also result in a file not being archived as intended. A reconciliation process that is carried out in some systems may be disrupted, or may not occur often enough to detect a problem.

To provide more versatility and convenience for users of modern digital collaboration platforms and applications, a collaboration platform according to this disclosure stores files with not only a descriptor that includes a record retention time, but also an archival status retention flag (the "retention flag" or the "flag") configured to prevent the deletion of the file from the storage device until the flag is cleared. In some examples, the collaboration platform also includes an application programming interface (API) that allows the archive system to programmatically clear the archival status retention flag once a file has been safely copied into the archive.

In some examples, the archival status retention flag can be set, or not, for a file based on a potential compliance risk associated with the file as determined by the identity of the originator of the file, the file's creation date, the participants in the collaboration that created the file content, or any other programmatically determined value or criterion. Examples of collaborations that may create such files include audio-conferences, videoconferences, chats, and whiteboard collaborations, any of which can produce stored recordings.

A collaboration platform according to some examples stores, in a storage device, a file and a descriptor corresponding to the file. The descriptor includes a retention time for the file. The system also sets the archival status retention flag to prevent the deletion of the file from the storage device, notwithstanding the retention time set by the descriptor. The system can transmit a copy of the file to an archive. When a copy of the file has been safely stored in the archive, the collaboration platform receives an input that confirms the status of the file as safely stored in the archive. This input may be received, as examples, through a message arriving over a network such as the Internet, or through an API that is exposed to the archive's servers. The input is configured to clear the archival status retention flag. For example, the input configured to clear the archival status retention flag may be receivable through the API discussed herein. Once the flag has been cleared, the file can be deleted from the collaboration platform's storage in accordance with the retention time from the descriptor.

In some examples, the archive is managed by a third party, such as an enterprise that provides archival services. In such an example, the archival status retention flag is accessible to a third party from outside of the systems of the collaboration platform, for example, though an API. Such access is atypical. Further, the archival status retention flag in some examples cannot be changed by the collaboration platform and overrides settings made by administrators or users of the collaboration platform. Thus, the flag is not necessarily under the control of the system resources of the collaboration platform.

As an example, the descriptor may specify a retention time, either as a period of time, or a specific date and/or time until which the file is to be retained. If this retention time has not elapsed when the retention flag is cleared, the file will be deleted from the storage devices of the collaboration platform on or after the retention time has been reached. Clearing the retention flag restores the file retention policy that has been otherwise set. If the retention time has run prior to clearing the retention flag, the file will be deleted from the storage devices of the collaboration platform in accordance with the programmed operation of the collaboration platform's software and hardware. Deletion may be immediate, or may take place in accordance with a file deletion cycle, for example, the next night or weekend after the file has been decisioned for deletion.

The techniques disclosed herein provide an extra feature as a failsafe to ensure that important stored files are not inadvertently completely deleted. The archival status retention flag can be used in conjunction with file reconciliation processes that may be run on some systems, whereby the contents of an archive and the contents of the platform or system creating files are compared at regular intervals to ascertain if any files are missing from the archive. The feature provides extra assurance for files that may need to be retained to comply with laws, regulations, or legal holds.

This illustrative example is given to introduce the reader to the general subject matter discussed herein and the disclosure is not limited to this example. The following sections describe various additional non-limiting examples and examples of systems and methods for providing an archival status retention flag for stored files.

Referring now to FIG. 1, FIG. 1 shows an example system 100 that provides videoconferencing functionality to various client devices. The system 100 includes a video conference provider 110 that is connected to multiple communication networks 120, 130, through which various client devices 140-180 can participate in video conferences hosted by the video conference provider 110. For example, the video conference provider 110 can be located within a private network to provide video conferencing services to devices within the private network, or it can be connected to a public network, e.g., the internet, so it may be accessed by anyone. Some examples may even provide a hybrid model in which a video conference provider 110 may supply components to enable a private organization to host private internal video conferences or to connect its system to the video conference provider 110 over a public network.

The system optionally also includes one or more user identity providers, e.g., user identity provider 115, which can provide user identity services to users of the client devices 140-160 and may authenticate user identities of one or more users to the video conference provider 110. In this example, the user identity provider 115 is operated by a different entity than the video conference provider 110, though in some examples, they may be the same entity.

Figure 2:
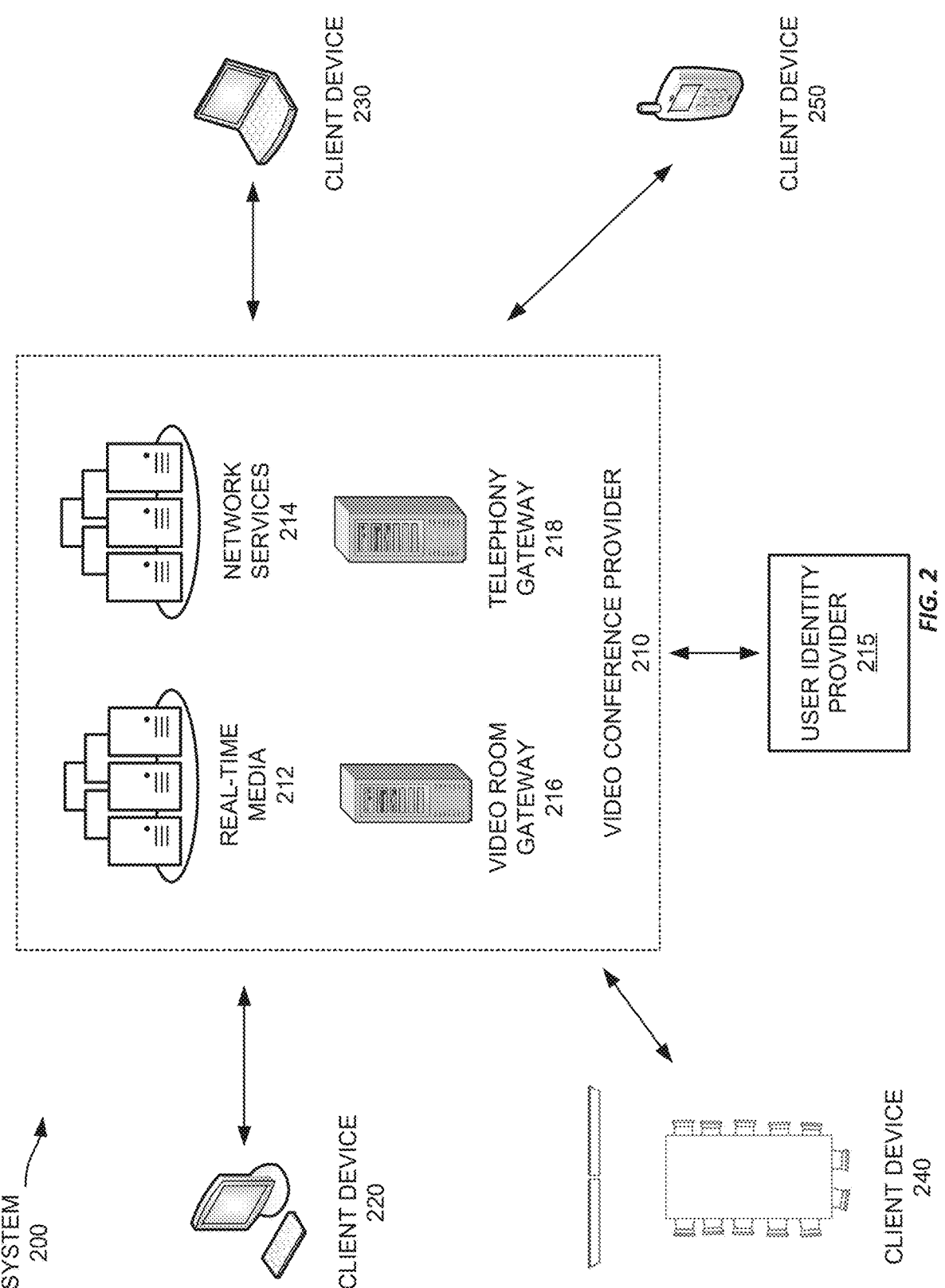

Video conference provider 110 allows clients to create videoconference meetings (or "meetings") and invite others to participate in those meetings as well as perform other related functionality, such as recording the meetings, generating transcripts from meeting audio, manage user functionality in the meetings, enable text messaging during the meetings, create and manage breakout rooms from the main meeting, etc. FIG. 2, described below, provides a more detailed description of the architecture and functionality of the video conference provider 110.

Meetings in this example video conference provider 110 are provided in virtual "rooms" to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used. Further, in some examples, and as alluded to above, a meeting may also have "breakout" rooms. Such breakout rooms may also be rooms that are associated with a "main" videoconference room. Thus, participants in the main videoconference room may exit the room into a breakout room, e.g., to discuss a particular topic, before returning to the main room. The breakout rooms in this example are discrete meetings that are associated with the meeting in the main room. However, to join a breakout room, a participant must first enter the main room. A room may have any number of associated breakout rooms according to various examples.

To create a meeting with the video conference provider 110, a user may contact the video conference provider 110 using a client device 140-180 and select an option to create a new meeting. Such an option may be provided in a webpage accessed by a client device 140-160 or client application executed by a client device 140-160. For telephony devices, the user may be presented with an audio menu that they may navigate by pressing numeric buttons on their telephony device. To create the meeting, the video conference provider 110 may prompt the user for certain information, such as a date, time, and duration for the meeting, a number of participants, a type of encryption to use, whether the meeting is confidential or open to the public, etc. After receiving the various meeting settings, the video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started, or the host may be required to specifically admit one or more of the users.

During the meeting, the participants may employ their client devices 140-180 to capture audio or video information and stream that information to the video conference provider 110. They also receive audio or video information from the video conference provider 210, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting, and they will no longer receive audio or video streams for the meeting (and will stop transmitting audio or video streams). The video conference provider 110 may also invalidate the meeting information, such as the meeting identifier or password/passcode.

To provide such functionality, one or more client devices 140-180 may communicate with the video conference provider 110 using one or more communication networks, such as network 120 or the public switched telephone network ("PSTN") 130. The client devices 140-180 may be any suitable computing or communications device that have audio or video capability. For example, client devices 140-160 may be conventional computing devices, such as desktop or laptop computers having processors and computer-readable media, connected to the video conference provider 110 using the internet or other suitable computer network.

Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and is not limited solely to dedicated telephony devices like conventional telephones.

Referring again to client devices 140-160, these devices 140-160 contact the video conference provider 110 using network 120 and may provide information to the video conference provider 110 to access functionality provided by the video conference provider 110, such as access to create new meetings or join existing meetings. To do so, the client devices 140-160 may provide user identification information, meeting identifiers, meeting passwords or passcodes, etc. In examples that employ a user identity provider 115, a client device, e.g., client devices 140-160, may operate in conjunction with a user identity provider 115 to provide user identification information or other user information to the video conference provider 110.

A user identity provider 115 may be any entity trusted by the video conference provider 110 that can help identify a user to the video conference provider 110. For example, a trusted entity may be a server operated by a business or other organization and with whom the user has established their identity, such as an employer or trusted third-party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 115 by the user and secured by a password or additional security features, such as biometric authentication, two-factor authentication, etc. However, identities may be distinct from functionality such as email. For example, a health care provider may establish identities for its patients. And while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the video conference provider 110.

When the user accesses the video conference provider 110 using a client device, the video conference provider 110 communicates with the user identity provider 115 using information provided by the user to verify the user's identity. For example, the user may provide a username or cryptographic signature associated with a user identity provider 115. The user identity provider 115 then either confirms the user's identity or denies the request. Based on this response, the video conference provider 110 either provides or denies access to its services, respectively.

For telephony devices, e.g., client devices 170-180, the user may place a telephone call to the video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the video conference provider 110. For example, telephony devices may be unable to provide user identification information to identify the telephony device or the user to the video conference provider 110. Thus, the video conference provider 110 may provide more limited functionality to such telephony devices. For example, the user may be permitted to join a meeting after providing meeting information, e.g., a meeting identifier and passcode, but they may be identified only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide user identification information to the video conference provider 110, even in cases where the user has an authenticated identity and employs a client device capable of identifying the user to the video conference provider 110. The video conference provider 110 may determine whether to allow such anonymous users to use services provided by the video conference provider 110. Anonymous users, regardless of the reason for anonymity, may be restricted as discussed above with respect to users employing telephony devices, and in some cases may be prevented from accessing certain meetings or other services, or may be entirely prevented from accessing the video conference provider 110.

Referring again to video conference provider 110, in some examples, it may allow client devices 140-160 to encrypt their respective video and audio streams to help improve privacy in their meetings. Encryption may be provided between the client devices 140-160 and the video conference provider 110 or it may be provided in an end-to-end configuration where multimedia streams transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the video conference provider 110, while allowing the video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus, the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the video conference provider 110. Further, such a system enables users to use a wide variety of different client devices 140-180 from traditional standards-based video conferencing hardware to dedicated video conferencing equipment to laptop or desktop computers to handheld devices to legacy telephony devices, etc.

Referring now to FIG. 2, FIG. 2 shows an example system 200 in which a video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the video conference provider 210 over a communications network, such as the internet for client devices 220-240 or the PSTN for client device 250, generally as described above with respect to FIG. 1. The video conference provider 210 is also in communication with one or more user identity providers 215, which can authenticate various users to the video conference provider 210 generally as described above with respect to FIG. 1.

In this example, the video conference provider 210 employs multiple different servers (or groups of servers) to provide different aspects of video conference functionality, thereby enabling the various client devices to create and participate in video conference meetings. The video conference provider 210 uses one or more real-time media servers 212, one or more network services servers 214, one or more video room gateway servers 216, and one or more telephony gateway servers 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed streams to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead, each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the video conference provider 210. In some such examples, the real-time media servers 212 may decrypt incoming multimedia streams, multiplex the multimedia streams appropriately for the various clients, and encrypt the multiplexed streams for transmission.

In some examples, to provide multiplexed streams, the video conference provider 210 may receive multimedia streams from the various participants and publish those streams to the various participants to subscribe to and receive. Thus, the video conference provider 210 notifies a client device, e.g., client device 220, about various multimedia streams available from the other client devices 230-250, and the client device 220 can select which multimedia stream(s) to subscribe to and receive. In some examples, the video conference provider 210 may provide to each client device the available streams from the other client devices, but from the respective client device itself, though in other examples it may provide all available streams to all available client devices. Using such a multiplexing technique, the video conference provider 210 may enable multiple different streams of varying quality, thereby allowing client devices to change streams in real-time as needed, e.g., based on network bandwidth, latency, etc.

As mentioned above with respect to FIG. 1, the video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the video conference provider 210 may allow a meeting participant to notify it of inappropriate behavior or content in a meeting. Such a notification may trigger the real-time media servers to 212 record a portion of the meeting for review by the video conference provider 210. Still other functionality may be implemented to take actions based on the decrypted multimedia streams at the video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the system of video conference provider 210 and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the video conference provider under a supervisory set of servers. When a client device 220-250 accesses the video conference provider 210, it will typically communicate with one or more network services servers 214 to access their account or to participate in a meeting.

When a client device 220-250 first contacts the video conference provider 210 in this example, it is routed to a network services server 214. The client device may then provide access credentials for a user, e.g., a username and password or single sign-on credentials, to gain authenticated access to the video conference provider 210. This process may involve the network services servers 214 contacting a user identity provider 215 to verify the provided credentials.

Once the user's credentials have been accepted, the client device may perform administrative functionality, like updating user account information, if the user has an identity with the video conference provider 210, or scheduling a new meeting, by interacting with the network services servers 214.

In some examples, users may access the video conference provider 210 anonymously. When communicating anonymously, a client device 220-250 may communicate with one or more network services servers 214 but only provide information to create or join a meeting, depending on what features the video conference provider allows for anonymous users. For example, an anonymous user may access the video conference provider using client 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, creating sub-meetings or "break-out" rooms, recording meetings, etc. Such functionality may be managed by the network services server(s) 214.

For example, if a host wishes to remove a user from a meeting, they may identify the user and issue a command through a user interface on their client device. The command may be sent to a network services server 214, which may then disconnect the identified user from the corresponding real-time media server 212. If the host wishes to create a break-out room for one or more meeting participants to join, such a command may also be handled by a network services server 214, which may create a new meeting record corresponding to the break-out room and then connect one or more meeting participants to the break-out room similarly to how it originally admitted the participants to the meeting itself.

In addition to creating and administering on-going meetings, the network services server(s) 214 may also be responsible for closing and tearing-down meetings once they have completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the video conference provider 210. For example, the video conferencing hardware may be provided by the video conference provider to one or more of its subscribers, which may provide access credentials to the video conferencing hardware to use to connect to the video conference provider 210.

The video room gateway servers 216 provide specialized authentication and communication with the dedicated video conferencing hardware that may not be available to other client devices 220-230, 250. For example, the video conferencing hardware may register with the video conference provider 210 when it is first installed and the video room gateway servers 216 may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the video conference provider 210.

Referring now to the telephony gateway servers 218, these servers 218 enable and facilitate telephony devices' participation in meetings hosed by the video conference provider 210. Because telephony devices communicate using the PSTN and not using computer networking protocols, such as TCP/IP, the telephony gateway servers 218 act as an interface that converts between the PSTN and the networking system used by the video conference provider 210.

For example, if a user uses a telephony device to connect to a meeting, they may dial a phone number corresponding to one of the video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio signals to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server 218 is instead joined to the meeting on the telephony device's behalf.

After joining the meeting, the telephony gateway server 218 receives an audio stream from the telephony device and provides it to the corresponding real-time media server 212, and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

Figure 3:
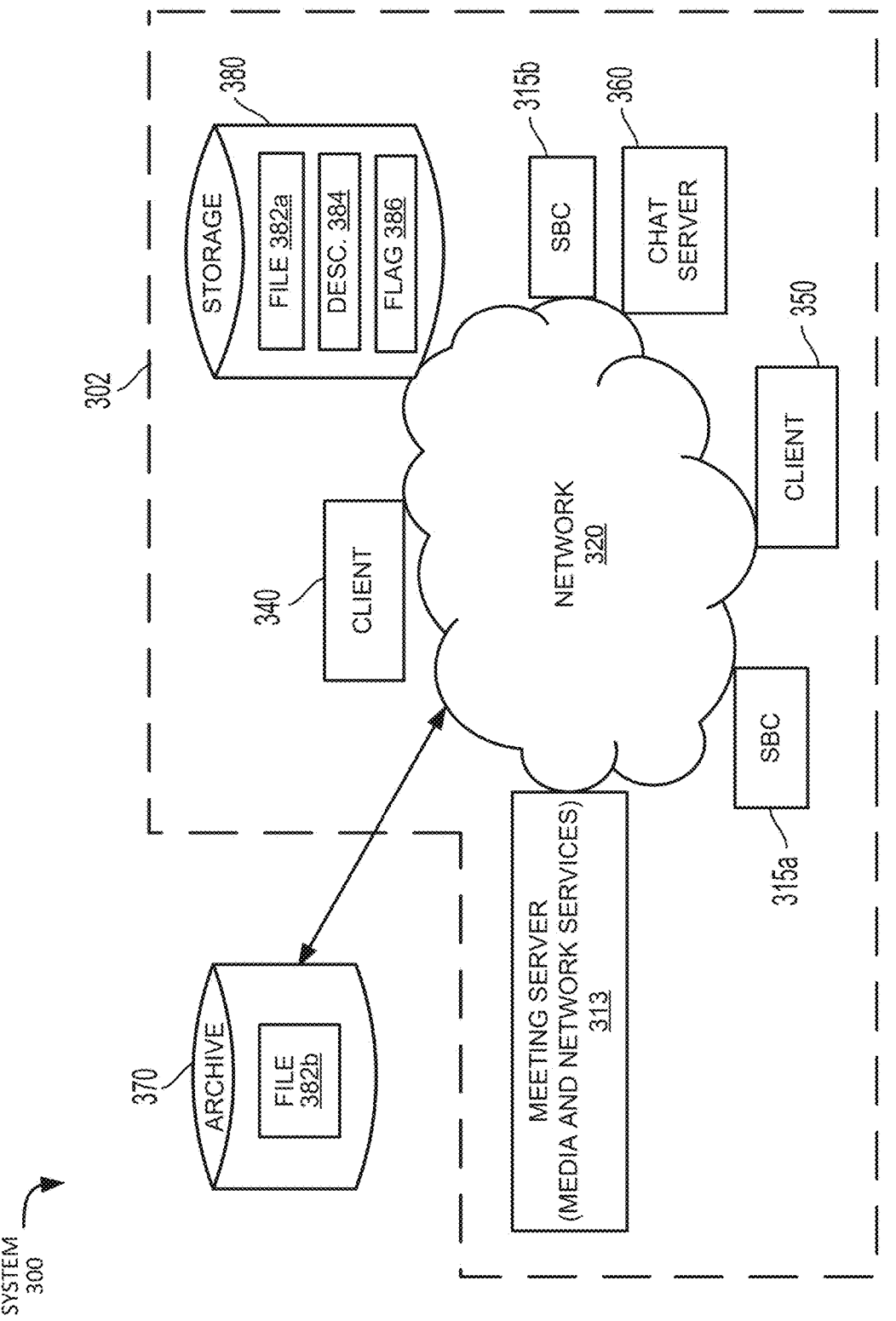

Referring now to FIG. 3, FIG. 3 shows an example system 300 in which at least videoconferencing functionality, digital phone functionality and chat functionality is provided to various client devices, such as client device 340 and client device 350, each communicatively coupled to network 320. System 300 includes the archival status retention flag as described herein. System 300 includes a collaboration platform 302, which includes meeting server 313. Meeting server 313 may also be referred to as a multimedia router and can be implemented by the real-time media servers 212 working with the network services servers 214. The meeting server maintains stored representations of virtual meetings taking place in the system so that the meeting server can keep track of the status of meetings without constantly exchanging this information with client devices such as client device 340 and client device 350. Collaboration platform 302 includes chat server 360 that provides chat services. Server 360 stores group definitions, which define chat groups, each with multiple users. The chat dialogs and identities of users participating in the chat groups can be presented to users through graphical interfaces of client applications running on client devices 340 and 350, either through a chat client application or through a collaboration platform client application that serves as a client application for multiple functions. Chat groups can also be provided in a Web browser along with other visual interface features to enable users of computing devices without a client application installed to make use of team chat services.

Collaboration platform 302 includes session border controllers (SBCs) 315*a-b* for providing digital telephony services. Collaboration platform 302 includes two SBCs as an example. Any number of SBCs can be used; multiple SBCs provide redundancy. The SBCs provide call CODECs, audio processing, error correction, links to telephone carriers, and encryption for digital telephone calls between client applications to provide digital phone services. The SBCs secure client and carrier communications passing through a data center. The SBCs include load balancers and call switches. As an example, signaling for call setup, management, and teardown in collaboration platform 302 can be accomplished using session initiation protocol (SIP). SIP communication through the call switches is evenly distributed by the load balancers based on call volume. The call switches provide call control for digital telephone communications and can provide PBX functionality. The call switches also provide integrated functions to enable calls to be transitioned to videoconferences using meeting server 313 and/or vice versa.

Some collaboration platforms have services in addition to the above that may generate stored files to be archived. Examples include digital spaces or rooms, instant messages, and email. These services can be communicatively coupled to the collaboration platform client applications on the client devices, and to any store-and-forward processes for the collaboration platform.

In this example, client device 340 and client device 350 each include an instance of a collaboration platform client application, which can act as a unified interface for audio and/or video (A/V) conferencing, digital phone and chat capabilities, as well as others. The client application can be provided by a dedicated software client or by a web browser. An A/V conferencing user interface can be coupled to meeting server 313 to provide videoconferencing meetings or to the SBCs to provide audioconferencing using digital telephony. Archive 370 can be connected to network 320 and accessed by a collaboration platform 302 in order to archive files that are initially kept in storage 380 within the collaboration platform 302. Where the archive is managed by a third party, the archival status retention flag is accessible to the third party from outside of the systems of the collaboration platform, for example, though the API. The archival status retention flag also may not be changeable by the collaboration platform.

In some examples, files within collaboration platform 302 are managed on a scheduled, store-and-forward basis. For example, file 382*a* may be created and retained on a storage device within storage 380 in collaboration platform 302. This file may contain a video or audio recording, chat exchange, digital whiteboard graphic, or a document, to name a few examples. File 382*a* can reside in storage 380 until it is scheduled to be forwarded to the archive 370 over network 320. At the scheduled time, the file is copied to as file 382*b* to storage devices in the archive 370 in system 300.

Storage devices typically also reside in one or more collaboration platform client devices such as those for client device 340 and client device 350. It is possible for files to be stored and forwarded from the client devices in addition to or instead of using collaboration platform storage 380. It is also possible for files to be stored and forwarded from the client devices and stored and forwarded again from storage 380 to archive 370.

The file as originally stored, file 382*a*, is stored with corresponding data that provides for the management of the file in terms of retention time within collaboration platform 302. This data includes descriptor 384. In the examples herein, the descriptor includes a retention time for the file within the collaboration platform. The retention time can be specified in any number of ways. As examples, it may be specified as a number of days, weeks, months, hours, etc. from the file's creation date. It can also be specified as a specific date and/or time at which the file may be deleted. Storage 380 also includes the archival status retention flag 386, which is configured to prevent the deletion of the file from the storage device. As examples, the flag may be a bit or value that is toggled such that one value indicates that the file is not to be deleted notwithstanding the retention time specified in descriptor 384 and the other value indicates that the file is to be treated in accordance with descriptor 384 with respect to retention time. The flag can be referred to herein as being "toggled" between these two values, or "set" when it prevents deletion and "cleared" when it permits deletion.

Referring now to method 400 illustrated in FIG. 4, FIG. 4 shows an example method 400 for providing the archival status retention flag for stored files. The description of the method 400 in FIG. 4 will be made with reference to the system of FIG. 3. However, any suitable system according to this disclosure may be used, such as the example systems 100 and 200 shown in FIGS. 1 and 2.

At block 410 in FIG. 4, a processor or processors, for example, a processor such as processor 710 (discussed below with respect to FIG. 7) running in servers and/or in client devices of collaboration platform 302, stores, in a storage device, a file and a descriptor corresponding to the file, such as, for example, descriptor 384. The descriptor includes a retention time for the file. At block 412, the processor sets the archival status retention flag to prevent the deletion of the file from the storage device. At block 414, the processor transmits a copy of the file to the archive, for example, archive 370.

The retention flag can take many different forms and may be referred to as a "tag," "bit," etc. It may be a bit for example, where one value indicates "do not delete" and the other value indicates "delete." As another example the flag may also be implemented as a Boolean operator for a named variable such as "auto-delete" that takes the value of "true" or "false," wherein a value of "true" indicates that autodeletion according to file retention policies is allowed and "false" indicates that autodeletion according to file retention policies is not allowed.

Continuing with FIG. 4, at block 416, the processor receives an input message or notification from the archive and clears the flag. The archival status retention flag may be accessible to a third party from outside of the systems of the collaboration platform, for example, by a third-party archival service though the API. The archival status retention flag may override settings made by administrators or users of the collaboration platform. The archive provides the notice to the collaboration platform in response to a copy of the file being stored in the archive so that the file can be safely deleted from storage device(s) owned and/or managed by the collaboration platform. At block 418, the processor selectively deletes the file from storage 380, in response to the clearing of the archival status retention flag. By "selectively" deleting, what is meant is that the file is deleted from the storage device of the collaboration platform in accordance with the retention time specified in the descriptor, which may mean that the file is immediately marked for deletion because the retention time has elapsed, or that the file will be deleted in the future in accordance with the retention time.

The storage devices initially used to store files when created may reside in a cloud providing a service to an enterprise, with either the cloud service personnel or the enterprise personnel setting retention policies and reviewing reconciliation records. The retention flag can be set according to system configuration, for example, for all files stored, or for only certain files. Alternatively, the storage devices can reside within resources of the enterprise. It is also possible to implement a system in which files are stored and forwarded from the cloud system to storage devices controlled by the enterprise, from which archival copies are eventually produced in a store-and-forward fashion.

Figure 5:
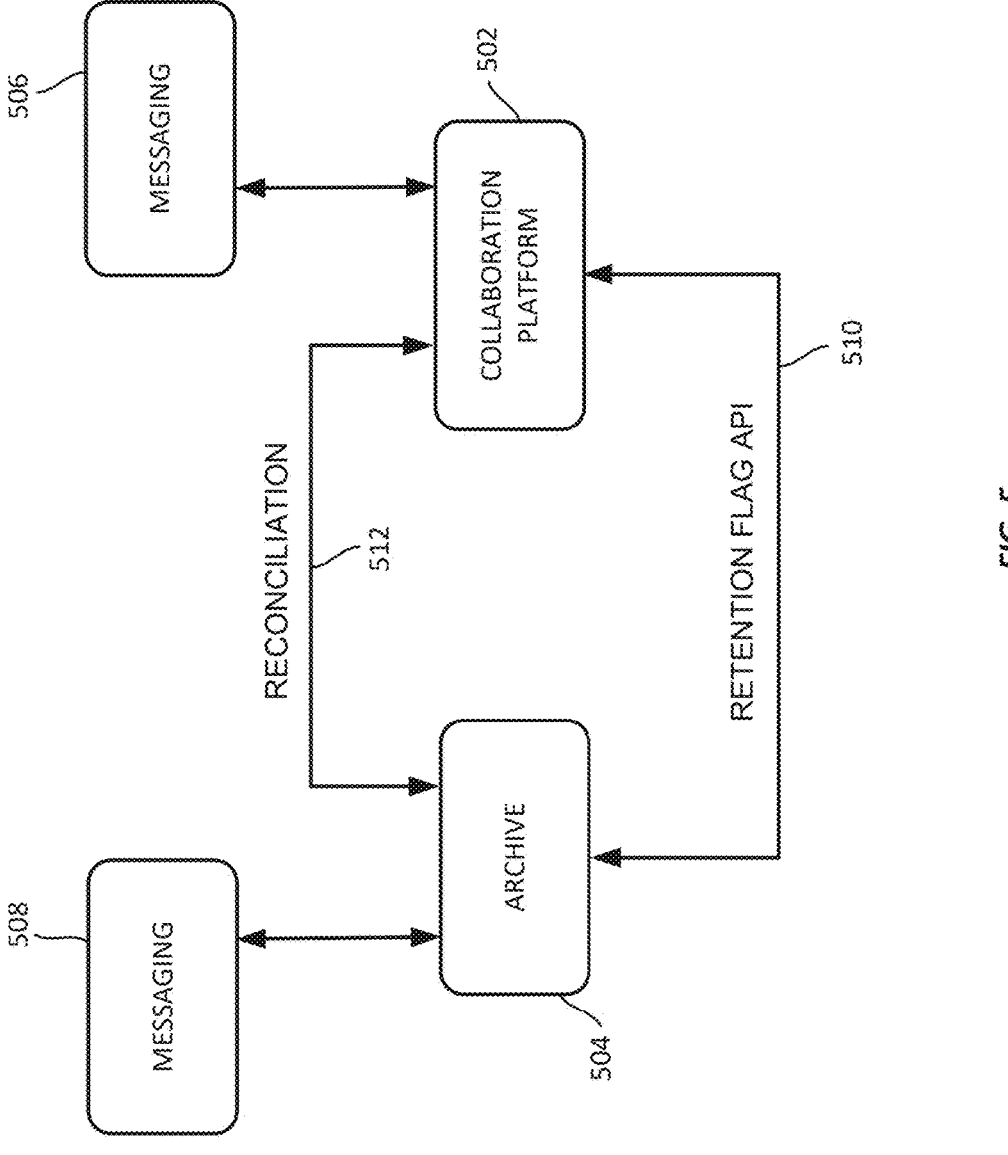
FIG. 5 illustrates an example process and API flow for providing an archival status retention flag for stored files.

Referring now to the process flow 500 illustrated in FIG. 5, FIG. 5 shows an example process flow showing various entities that can be involved in implementing the archival status retention flag as described herein. In this example, collaboration platform 502 is communicatively coupled with archive 504. With a third-party archive, the archival status retention flag is accessible to the third party from outside of the systems of the collaboration platform, for example, though an API. The archival status retention flag also may not be changeable to the collaboration platform. In this implementation, either or both of the collaboration platform 502 and the archive 504 can include a communication function for providing messages for the management of files in collaboration platform 502 and archive 504. Messaging module 506 is communicatively coupled with collaboration platform 502 and messaging module 508 is communicatively coupled with archive 504.

An API 510 is exposed by the collaboration platform 502 to archive 504. The API provides a mechanism for the archive 504 to provide input to the collaboration platform 502 to clear the archival status retention flag, for example, flag 386, so that configured data retention policies can take effect for the respective file. Archive 504 is configured in this implementation to clear the flag for a file when the file has been safely stored in the archive. Reconciliation messaging 512 can continue in parallel with the use of the archival status retention flag. These two techniques are by no means mutually exclusive, and in many systems, it can be desirable to have both features operating together.

A messaging module or function such as messaging module 506 and messaging module 508 can be included in the collaboration platform, the archive, or both. A computing device within the respective system can determine, based on content of the file, a potential compliance risk associated with the file. The system can then set the retention flag based on this compliance risk. Further the system can generate a message regarding the compliance risk using messaging module 506 or messaging module 508 to display information accessed from the file and notify personnel of the compliance risk and that the retention flag is being set. A system can also query personnel for input regarding whether to set the flag. Messages can also be used to notify a user or administrator of an error condition or the failure to archive a file.

It is entirely possible that some systems are configured so that only certain files will have the flag set, with other files being permitted to be deleted according to established document retention policies regardless of whether a file has been archived. Information can be "displayed" by outputting to a computing device using the messaging module to send to a console or to send the information in a message to an administrator or user, for example a text message or a push message to the administrator's or user's computing device.

Figure 6:
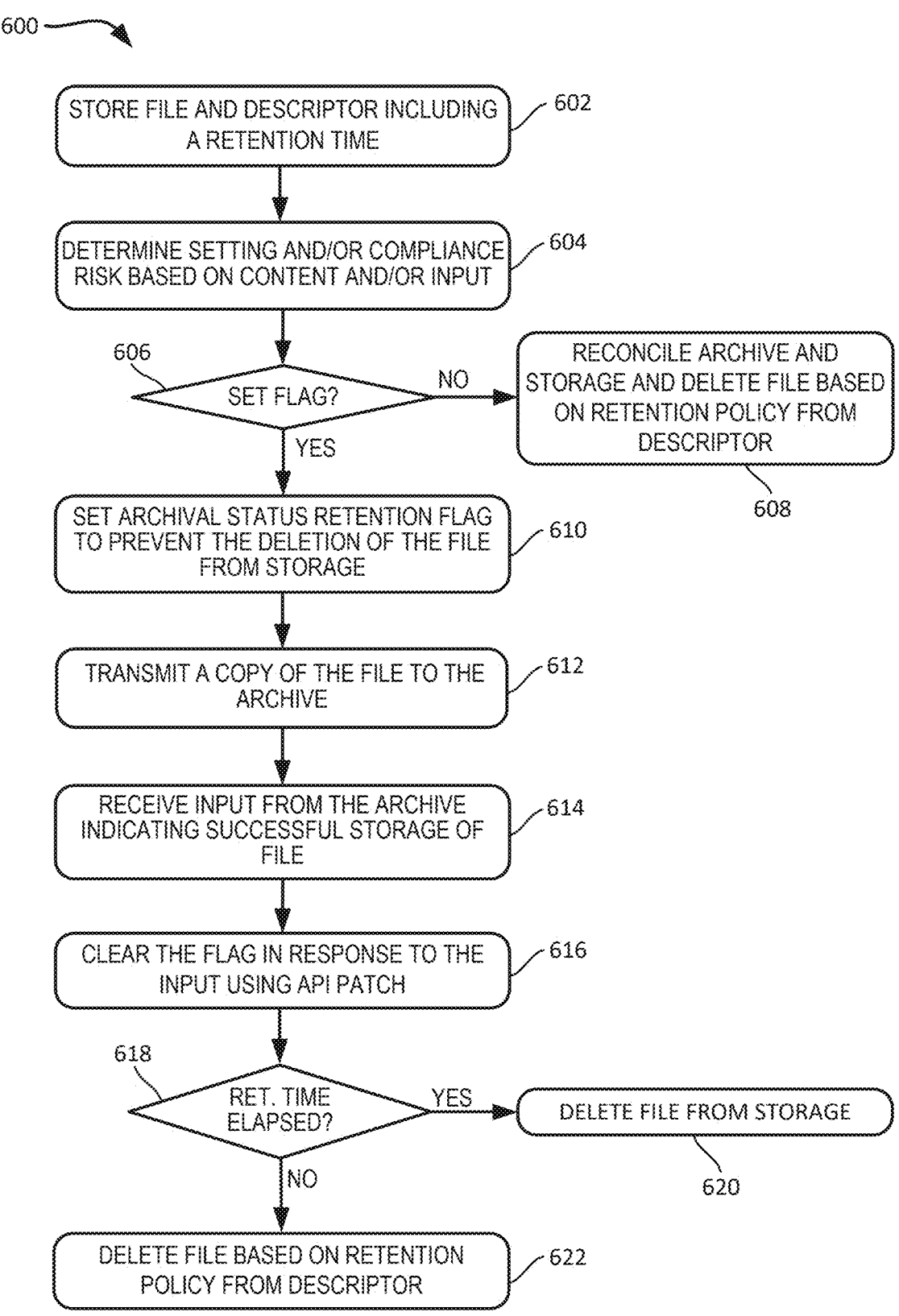
FIG. 6 illustrates another example method for providing an archival status retention flag for stored files.

FIG. 6 illustrates another example method for providing the archival status retention flag. Method 600 illustrates an example of providing the archival status retention flag for stored files. The description of the method 600 in FIG. 6 will be made with reference to the system of FIGS. 3 and 5. However, any suitable system according to this disclosure may be used, such as the example systems 100 and 200 shown in FIGS. 1 and 2.

At block 602 of FIG. 6, the processor stores the file and descriptor including a retention time. For example, file 382a and descriptor 384 can be stored in storage 380. At block 604, the processor determines whether the archival status retention flag is to be set. This determination can be made based on a configuration of the collaboration platform, such as a configuration in which all newly stored files have the flag set. The determination can also be made based on content of the file, metadata about the file, the potential compliance risk associated with the file, or any other criterion. The processor can make this determination automatically by analyzing the file or by displaying information accessed from the file through a console application along with a prompt message, or by sending a message to a computing device and accepting input designating, or not (selectively designating), the potential compliance risk in response to the input. Any such messaging can be handled by messaging module 506 or messaging module 508.

Continuing with FIG. 6, at block 606, the processor sets the flag, or not (selectively sets the flag) based on the determination made in block 604. If the flag is not set, the file will be deleted at block 608 in accordance with the retention time set in descriptor 384. In this case, the systems involved may rely on reconciling the archive with system storage through a process to verify the archive against the storage device(s) of the collaboration platform. Otherwise, the archival status retention flag is set at block 610 to prevent the deletion of the file from storage 380.

The retention time specified for a file can be configurable by the enterprise using the collaboration platform or by the provider of collaboration services. As an example, a system can be configured for retention times of up to 60 days. A reconciliation process compares the storage where the file is kept after being created with the archive to determine if all files that should be copied to the archive have in fact been copied to the archive. The reconciliation process can run independently of the copying of the files and verifies the files in the two storage entities at some regular interval, for example, once every day or once per week. If a file is found to be missing from the archive, the reconciliation process can trigger recopying the file to the archive.

At block 612 of FIG. 6, a copy of the file is transmitted from storage 380 of the collaboration platform 302 to the archive 370. The archival status retention flag may be accessible to the third party from outside of the systems of the collaboration platform, for example, though the API. At block 614, the processor receives input from the archive indicating successful storage of the file, and at block 616, the processor clears the flag. The input can be received, as an example, though API 510. The flag can be changed, as an example, by executing a patch that is called by the API in response to an input to the collaboration platform from the archive to clear the archival status retention flag. The value of the flag can be patched, as an example, from "false" to "true." The patch can also include other values that indicate the status of files in the archive and a time stamp, for example, "complete_time": "2023-04-15T02:12:27Z", "status": "completed".

Staying with FIG. 6, the management of a file depends on a determination made at block 618 as to whether the retention time from the descriptor has elapsed. If so, the file will be deleted by the collaboration platform at block 620. This deletion may or may not be immediate. Many systems go through a file clean up process at regular intervals and the deletion of the file may wait until the next time such a process runs. If the retention time has not elapsed at block 618, the file will be deleted at block 622 according to the document retention policy as reflected in the retention time specified in a descriptor such as descriptor 384.

Figure 7:
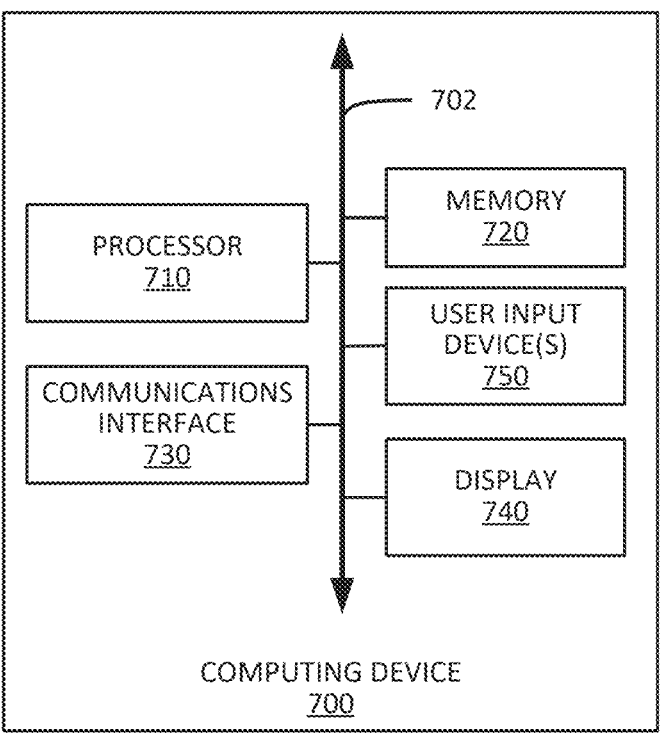
FIG. 7 shows an example computing device suitable for use with any disclosed systems, user interfaces, or methods according to this disclosure.

Referring now to FIG. 7, FIG. 7 shows an example computing device 700 suitable for use in example systems or methods for providing the archival status retention flag for stored files. The example computing device 700 includes a processor 710 which is in communication with the memory 720 and other components of the computing device 700 using one or more communications buses 702. The processor 710 is configured to execute processor-executable instructions stored in the memory 720 to perform one or more methods for providing an the archival status retention flag for stored files as discussed above. The computing device, in this example, also includes one or more user input devices 750, such as a keyboard, mouse, touchscreen, video input device (e.g., one or more cameras), microphone, etc., to accept user input, for example user input directed to obtaining and using external services in an integrated fashion. The computing device 700 also includes a display 740 to provide visual output to a user, for example, to display information and messages from messaging module 506 or messaging module 508.

The computing device 700 also includes a communications interface 730. In some examples, the communications interface 730 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

As used below, any reference to a series of examples is to be understood as a reference to each of those examples disjunctively (e.g., "Examples 1-4" is to be understood as "Examples 1, 2, 3, or 4").

Example number 1 is a method including storing, in a storage device, a file and a descriptor corresponding to the file, the descriptor including a retention time for the file, and setting an archival status retention flag configured to prevent deletion of the file from the storage device. Example number 1 further includes transmitting a copy of the file to an archive, and clearing the archival status retention flag in response to an input received from the archive confirming storage of the copy of the file. Example number 1 also includes selectively deleting, in response to the clearing of the archival status retention flag, the file from the storage device in accordance with the retention time from the descriptor.

Example number 2 is a method according to example 1, wherein the retention time includes a time period for retention of the file, the method further including selectively deleting the file from the storage device at or after the time period for retention has elapsed.

Example number 3 is a method according examples 1-2, wherein the method further includes determining, based on content of the file, potential compliance risk associated with the file, and setting the archival status retention flag in accordance with the potential compliance risk.

Example number 4 is a method according examples 1-3, wherein determining the potential compliance risk further includes displaying information accessed from the file, and receiving input selectively designating the potential compliance risk.

Example number 5 is a method according to examples 1-4, wherein the input configured to clear the archival status retention flag is received through an application programming interface (API) exposed to the archive.

Example number 6 is a method according to examples 1-5, wherein clearing the archival status retention flag further includes applying a patch called by the API.

Example number 7 is a method according to examples 1-6, further including reconciling the archive and the storage device with respect to the file.

Example number 8 is system including a processor and at least one memory device including instructions that are executable by the processor to cause the processor to execute the method of any of examples 1-7.

Example number 9 is a non-transitory computer-readable medium including code that is executable by a processor for causing the processor to carry out the method of any of examples 1-7.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random-access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, which may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, memory device, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

That which is claimed is:

1. A method comprising:

storing, in a storage device, a file and a descriptor corresponding to the file, the descriptor including a retention time for the file;

determining, based on content of the file, a potential compliance risk associated with the file;

displaying, using a messaging module or console, in response to the determining of the potential compliance risk, information accessed from the file;

receiving, in response to the displaying of the information, an input confirming the potential compliance risk;

setting, in response to the input confirming the potential compliance risk, an archival status retention flag configured to prevent deletion of the file from the storage device;

transmitting a copy of the file to an archive;

clearing the archival status retention flag in response to an input received from the archive confirming storage of the copy of the file; and deleting, in response to the clearing of the archival status retention flag, the file from the storage device in accordance with the retention time from the descriptor.

2. The method of claim 1, wherein the retention time includes a time period for retention of the file, the method further comprising deleting the file from the storage device at or after the time period for retention has elapsed.

3. The method of claim 1, wherein the input configured to clear the archival status retention flag is received through an application programming interface (API) exposed to the archive.

4. The method of claim 3, wherein clearing the archival status retention flag further comprises applying a patch called by the API.

5. The method of claim 1, further comprising reconciling the archive and the storage device with respect to the file.

6. A system comprising:

a processor; and at least one memory device including instructions that are executable by the processor to cause the processor to:

store, in a storage device, a file and a descriptor corresponding to the file, the descriptor including a retention time for the file;

determine, based on content of the file, a potential compliance risk associated with the file;

display, using a messaging module or console, in response to the determining of the potential compliance risk, information accessed from the file;

receive, in response to the displaying of the information, an input confirming the potential compliance risk;

set, in response to the input confirming the potential compliance risk, an archival status retention flag configured to prevent deletion of the file from the storage device;

transmit a copy of the file to an archive;

clear the archival status retention flag in response to an input received from the archive confirming storage of the copy of the file; and selectively delete, in response to the clearing of the archival status retention flag, the file from the storage device in accordance with the retention time from the descriptor.

7. The system of claim 6, wherein the instructions are further executable to cause the processor to selectively delete the file from the storage device at or after a time period for retention has elapsed.

8. The system of claim 6, wherein the input configured to clear the archival status retention flag is receivable through an application programming interface (API) exposed to the archive.

9. The system of claim 8, wherein the instructions are further executable to cause the processor to apply a patch called by the API to clear the archival status retention flag.

10. The system of claim 6, wherein the instructions are further executable to cause the processor to reconcile the archive and the storage device with respect to the file.

11. A non-transitory computer-readable medium comprising code that is executable by a processor for causing the processor to:

store, in a storage device, a file and a descriptor corresponding to the file, the descriptor including a retention time for the file;

determine, based on content of the file, a potential compliance risk associated with the file;

display, using a messaging module or console, in response to the determining of the potential compliance risk, information accessed from the file;

receive, in response to the displaying of the information, an input confirming the potential compliance risk;

set, in response to the input confirming the potential compliance risk, an archival status retention flag configured to prevent deletion of the file from the storage device;

transmit a copy of the file to an archive;

clear the archival status retention flag in response to an input received from the archive confirming storage of the copy of the file; and selectively delete, in response to the clearing of the archival status retention flag, the file from the storage device in accordance with the retention time from the descriptor.

12. The non-transitory computer-readable medium of claim 11, wherein the code is further executable for causing the processor to selectively delete the file from the storage device at or after a time period for retention has elapsed.

13. The non-transitory computer-readable medium of claim 11, wherein the input configured to clear the archival status retention flag is receivable through an application programming interface (API) exposed to the archive.

14. The non-transitory computer-readable medium of claim 13, wherein the code is further executable for causing the processor to apply a patch called by the API to clear the archival status retention flag.

* * * * *